(12) United States Patent  (10) Patent No.: US 10,698,244 B2
Yamamoto  (45) Date of Patent: Jun. 30, 2020

(54) DISPLAY DEVICE

(71) Applicant: SHARP KABUSHIKI KAISHA, Sakai, Osaka (JP)

(72) Inventor: Yoshinori Yamamoto, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/174,629

(22) Filed: Oct. 30, 2018

(65) Prior Publication Data

US 2019/0129235 A1   May 2, 2019

(30) Foreign Application Priority Data

Oct. 30, 2017  (JP) .................. 2017-209035

(51) Int. Cl.
G02F 1/1333 (2006.01)
G06F 1/16 (2006.01)

(52) U.S. Cl.
CPC .......... *G02F 1/133308* (2013.01); *G02F 2001/133314* (2013.01); *G02F 2001/133322* (2013.01); *G02F 2001/133325* (2013.01); *G02F 2201/46* (2013.01); *G06F 1/1601* (2013.01)

(58) Field of Classification Search
CPC .. H05K 5/0017; H05K 5/0239; H05K 7/1439; G02F 1/133308; G02F 2001/133314; G02F 2001/16
See application file for complete search history.

(56) References Cited

U.S. PATENT DOCUMENTS

| 6,411,352 B1* | 6/2002 | Kim | G02F 1/133308 349/150 |
| 6,593,979 B1* | 7/2003 | Ha | G02F 1/133308 349/187 |
| 9,386,258 B2* | 7/2016 | Ohki | H04N 5/64 |
| 9,417,379 B2* | 8/2016 | Masuda | G02F 1/1333 |
| 9,528,690 B2* | 12/2016 | Kamata | G02F 1/133603 |
| 9,599,764 B2* | 3/2017 | Ozeki | G02B 6/0085 |
| 2007/0076139 A1* | 4/2007 | Bae | G02B 6/0088 349/58 |
| 2008/0088762 A1* | 4/2008 | Sawada | G02B 6/0081 349/58 |
| 2013/0141651 A1* | 6/2013 | Kuromizu | G02B 6/0088 348/739 |
| 2015/0055026 A1* | 2/2015 | Ikuta | H04N 5/64 348/791 |

(Continued)

FOREIGN PATENT DOCUMENTS

JP   2008046284 A   2/2008

Primary Examiner — Daniel P Wicklund
Assistant Examiner — Christopher L Augustin
(74) Attorney, Agent, or Firm — ScienBiziP, P.C.

(57) ABSTRACT

A display device includes a display component configured to display an image and having a display surface and an opposite surface opposite of the display surface, a fastener included on the opposite surface of the display component and protruding from the opposite surface toward an opposing component that is arranged opposite the opposite surface, the fastener having a stepped portion in a side surface thereof, and a functional component disposed between the opposing component and the opposite surface and having an end portion fitted in the stepped portion. The fastener fixes the opposing component to the display component.

1 Claim, 11 Drawing Sheets

(56) References Cited

U.S. PATENT DOCUMENTS

| | | | |
|---|---|---|---|
| 2016/0026030 A1* | 1/2016 | Kang | G02F 1/133308 |
| | | | 349/58 |
| 2016/0223726 A1* | 8/2016 | Kwon | G02B 5/0278 |
| 2016/0316583 A1* | 10/2016 | Bang | H05K 7/20963 |
| 2017/0176806 A1* | 6/2017 | Kang | G02B 6/0083 |
| 2018/0110138 A1* | 4/2018 | Oda | H05K 5/0017 |
| 2019/0132978 A1* | 5/2019 | Lim | H05K 5/006 |

\* cited by examiner

DISPLAY DEVICE

CROSS REFERENCE TO RELATED APPLICATION

This application claims priority from Japanese Patent Application No. 2017-209035 filed on Oct. 30, 2017. The entire contents of the priority application are incorporated herein by reference.

TECHNICAL FIELD

The technology described herein relates to a display device.

BACKGROUND

One example of a known display device is described in Japanese Unexamined Patent Application Publication No. 2008-46284. The display device described in Japanese Unexamined Patent Application Publication No. 2008-46284 includes a liquid crystal display panel, a lighting device (backlight portion), and a printed circuit hoard, which are stacked on top of each other in a metal rear case. The printed circuit board is fixed to the rear surface of the lighting device.

SUMMARY

The printed circuit board, which is a functional component, is held on the rear surface of the lighting device a holding structure. The holding structure for holding the functional component may be a stopper that is a portion of the plate member of the lighting device bent toward the functional component. In such a configuration, the formation of the stopper in the portion of the plate member leaves a through hole in the plate member. The through hole allows light in the lighting device to leak or allows foreign substances to enter the lighting device.

An object of the technology described herein is to provide a display device in which a functional component is held in position by a structure not having a through hole.

To solve the problem, a display device according to the technology described herein includes a display component configured to display an image and having a display surface and an opposite surface opposite to the display surface, a fastener included on the opposite surface of the display component and protruding from the opposite surface toward an opposing component that is arranged opposite the opposite surface, the fastener having a stepped portion in a side surface thereof and a functional component disposed between the opposing component and the opposite surface and having an end portion fitted in the stepped portion. The fastener fixes the opposing component to the display component.

If a portion of the plate member included in the display component is bent to form a stopper for holding the functional component, the plate member would have a through hole through which light leaks. However, in the configuration of the present technology, the functional component is held in position by the end portion fitted in the stepped portion of the fastener. This configuration allows the functional component to be held in position but does not form a through hole in the plate member included in the display component, allowing less light to leak. Furthermore, the fastener that fastens components, not the functional component, together is used to hold the functional component, eliminating the need for an additional component for holding the functional component. The number of components does not increase.

According to the technology described herein, a display device in which a functional component is held in position by a structure not having a through hole is provided.

DETAILED DESCRIPTION

First Embodiment

Figure 1:
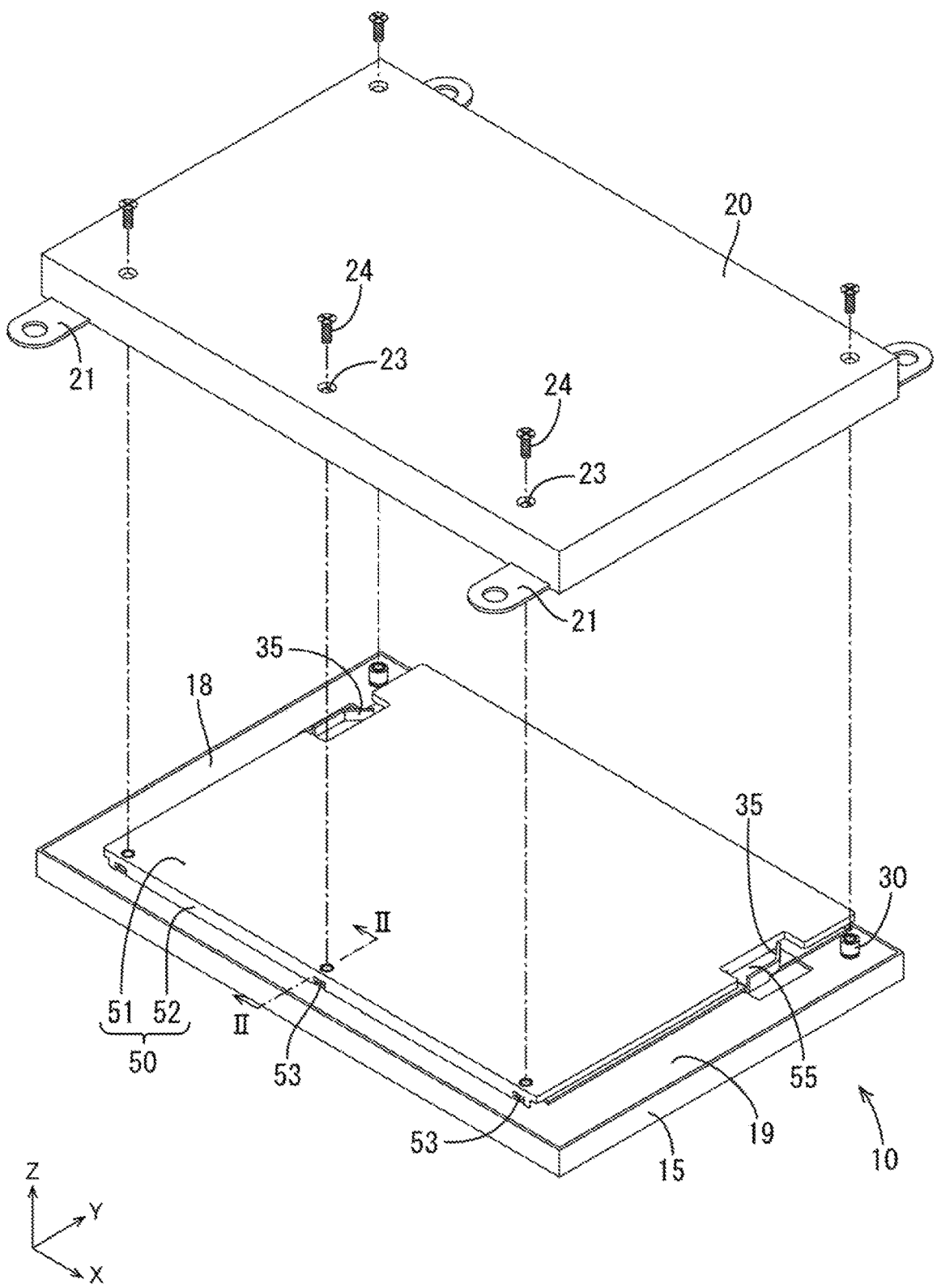
FIG. 1 is a perspective view illustrating a liquid crystal display device and an opposing component according to one embodiment.
Figure 2:
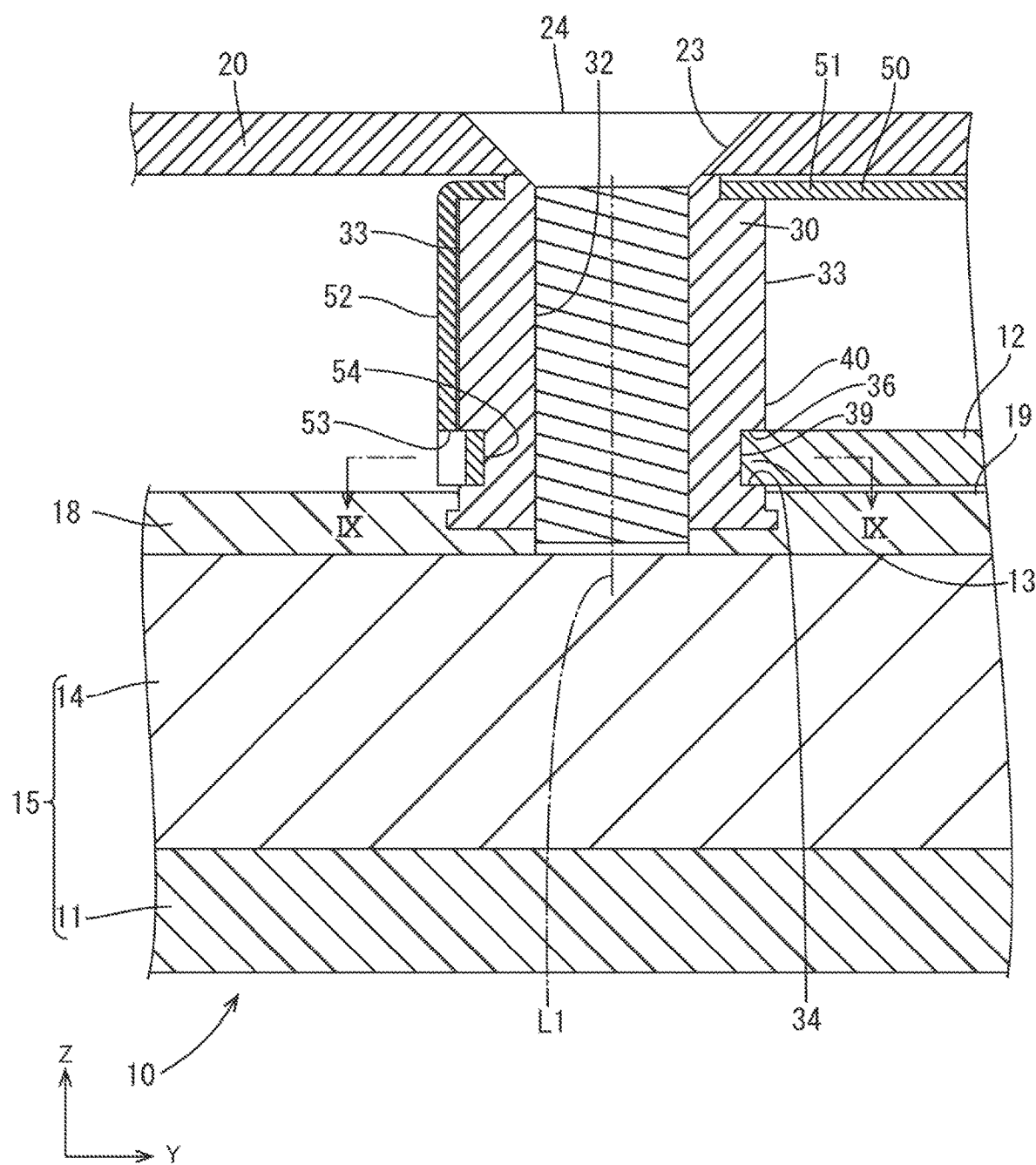
FIG. 2 is a cross-sectional view illustrating the liquid crystal display device and the opposing component (taken along line II-II in FIG. 1).

A first embodiment of the technology described herein will be described with reference to FIG. 1 to FIG. 10. As illustrated in FIG. 1 and FIG. 2, a liquid crystal display device 10 (display device) includes a liquid crystal module 15 (display component), a board 12 on the rear side of the liquid crystal module 15, a cover 50 covering the board 12, and a stud nut 30 fixing an opposing component 20 to a backlight device 14. As illustrated in FIG. 2, the liquid crystal module 15 includes a liquid crystal panel 11 (display panel) and the backlight device 14 (lighting device) as an external light source configured to apply light to the liquid crystal panel 11. As illustrated in FIG. 2, the backlight device 14 includes a chassis 18 (frame) having a box-like shape. The chassis 18 supports a light source and an optical member (not illustrated). The light emitted by the light source travels through the front surface (the lower surface in. FIG. 1) of the chassis 18 toward the liquid crystal panel 11. The liquid crystal display device 10 of the embodiment may be used in an electrical device (not illustrated), such as a mobile phone (such as a smartphone), a notebook computer (such as a tablet computer), a wearable device (such as a smart watch), a portable information device (such as an electronic book and a FDA), a portable game console, and a digital photo frame. The liquid crystal panel 11 includes a CF substrate (counter substrate), an array substrate, and a liquid crystal layer disposed between the substrates and displays an image by using light from the backlight device 14.

Figure 3:
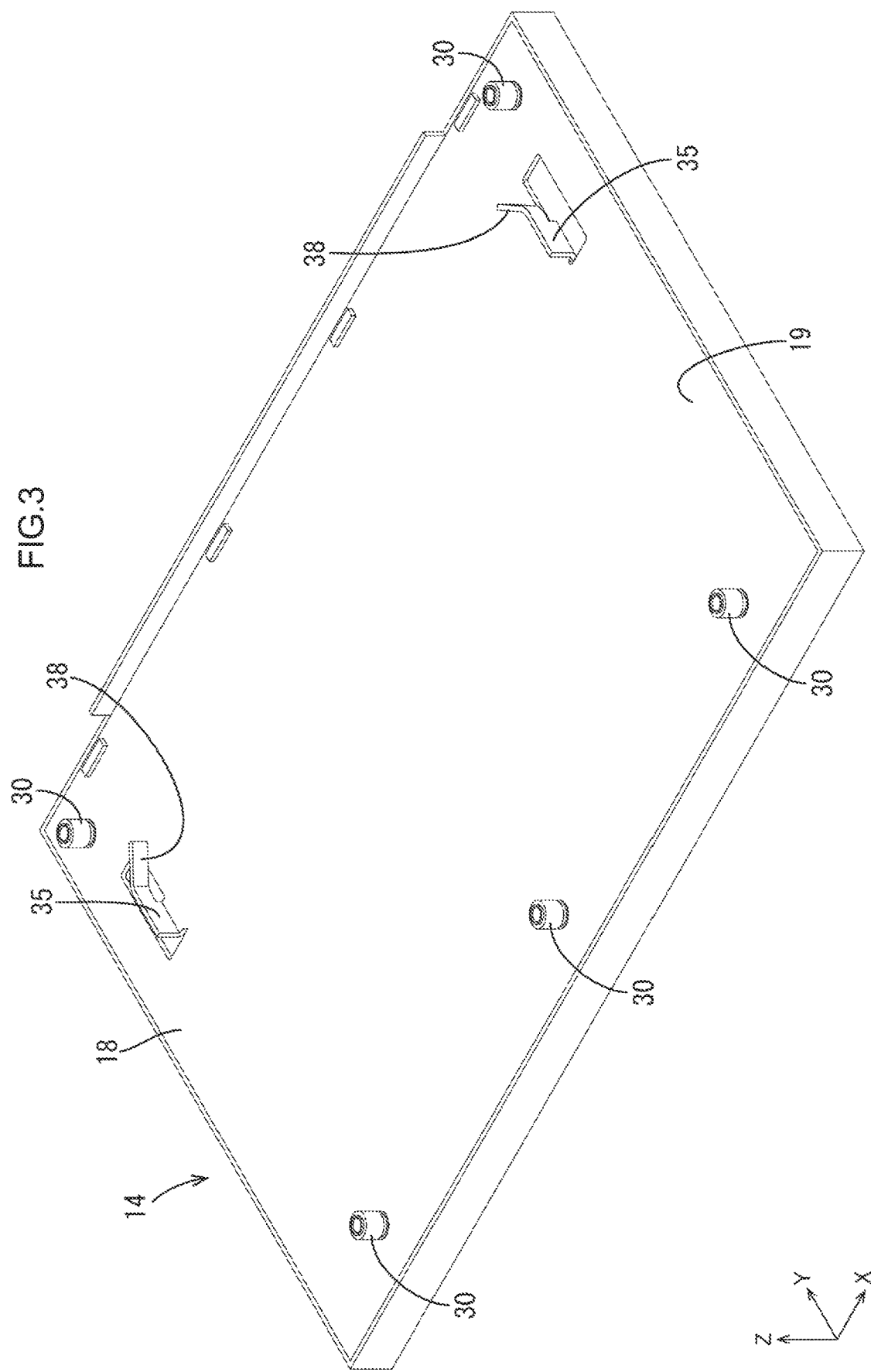
FIG. 3 is a rear perspective view illustrating a backlight device.
Figure 4:
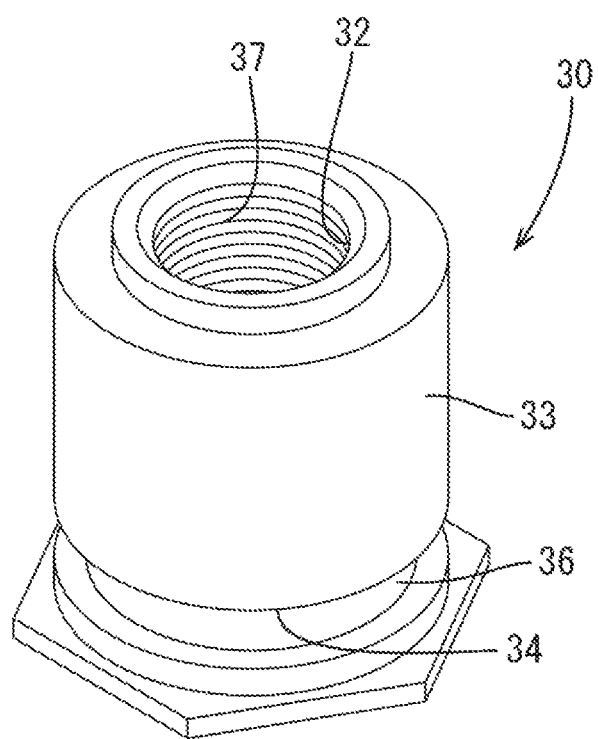
FIG. 4 is a perspective view illustrating a stud nut.

The stud nut 30 for fixing the opposing component 20 to the backlight device 14 is disposed on a rear surface 19 (surface opposite the display surface of the display component) of the chassis 18 of the backlight device 14. The stud nut 30 is press-fitted in the hole in the chassis 18, for example. The opposing component 20 is a component opposed to the rear surface 19 and may be a casing that houses the liquid crystal module 15. The casing is made of a metal such as aluminum or a synthetic resin and may be attached to an instrument panel of a vehicle by using an attachment piece 21 illustrated in FIG. 1, for example. The opposing component 20 is not limited to the casing. The opposing component 20 has through holes 23 in the bottom wall thereof. Bolts 24 no be fitted in the stud nuts 30 are in the through holes 23. As illustrated in FIG. 2, the stud nut 30 (fastener) protrudes from the rear surface 19 of the chassis 18 toward the opposing component 20. As illustrated in FIG. 4, the stud nut 30 has a cylindrical shape (a circular tubular shape) having on hole 32 in to which the bolt 24 is inserted. The inner surface of the insertion hole 32 has a helical groove 37 mating with the bolt 24. As illustrated in FIG. 3, the stud nuts 30 are disposed on the rear surface 19 of the chassis 18 at positions adjacent to the edges.

Figure 5:
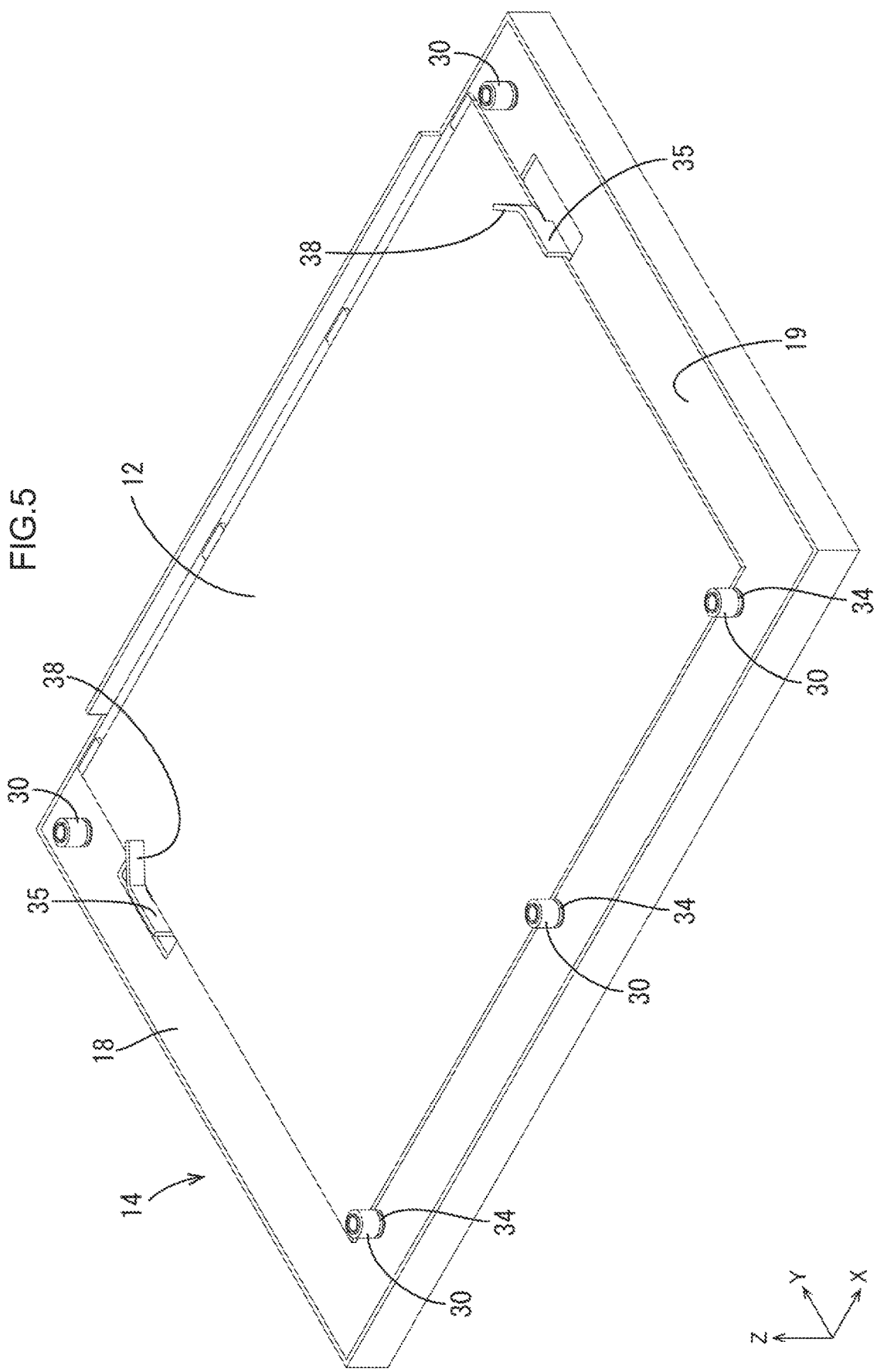
FIG. 5 is a perspective view illustrating the backlight device to which a board is attached.
Figure 6:
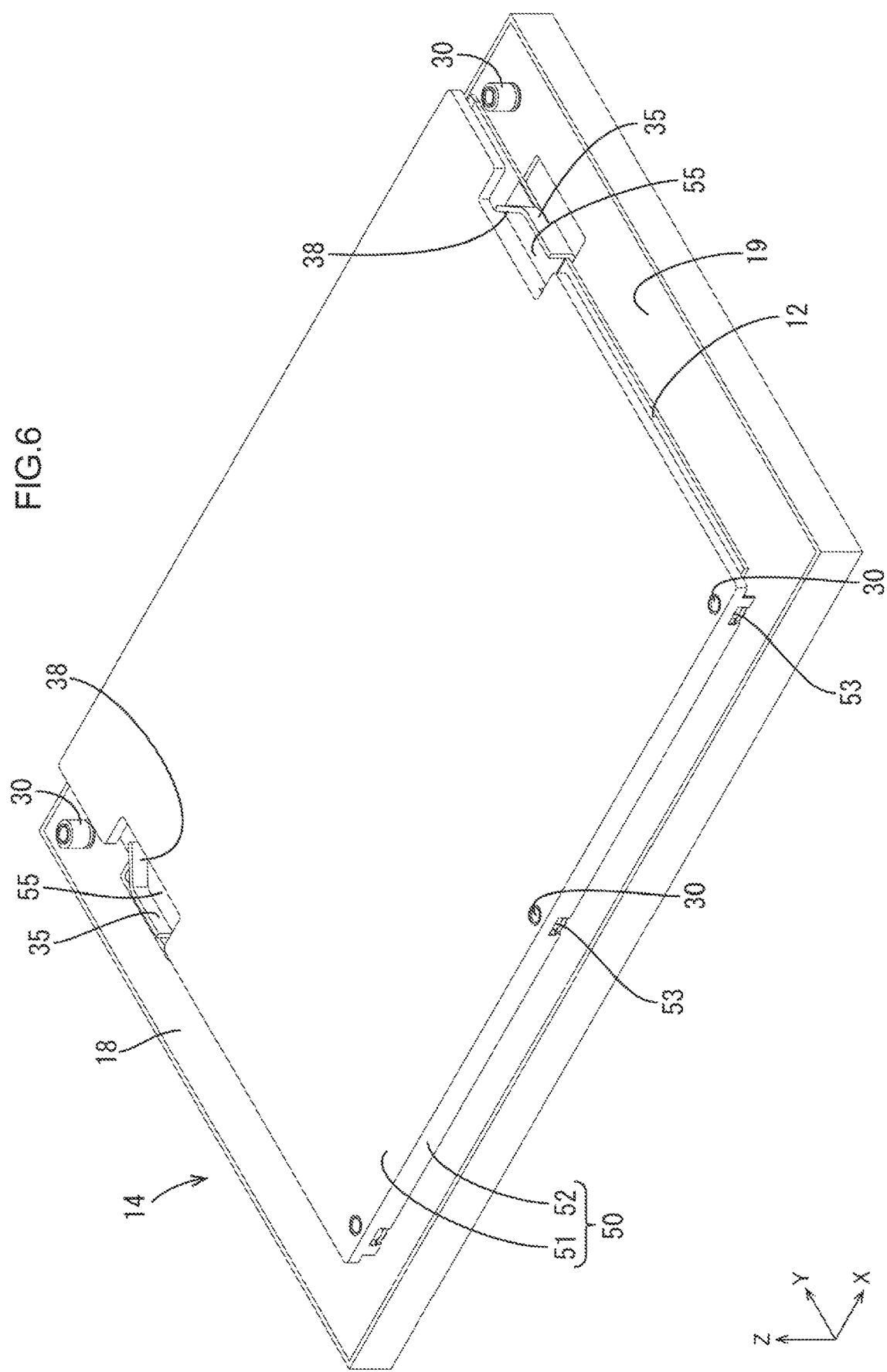
FIG. 6 is a perspective view illustrating the backlight device to which a cover is attached.

As illustrated in FIG. 4, the side surface 33 of the stud nut 30 has a recess 34 extending along the entire circumference of the stud nut 30. As illustrated in. FIG. 2, the board 12 (functional component), which is disposed between the opposing component 20 and the rear surface 19 of the chassis 18, fits in the recess 34 at the end portion 13. The board 12 is a control circuit board of the liquid crystal panel 11, for example. The board 12 is electrically connected to the liquid crystal panel 11 through a flexible board (not illustrated) and is configured to supply various signals to the liquid crystal panel 11 (mainly to a driver included in the liquid crystal panel 11). As illustrated in FIG. 2, a bottom surface 39 of the recess 34 is located at a position lower than the opening surface of the recess. Thus, an opening surface 40 of the recess 34 that is adjacent to the protruded end of the stud nut 30 and the bottom surface 39 form a steppe portion 36. In the stepped portion 36, the surface adjacent to the protruded end of the stud nut 30 (upper side in FIG. 2) is located at a higher position than the surface adjacent to the base (lower side in FIG. 2). The board 12 fitted in the stepped portion 36 is not displaced in a direction away from the rear surface 19. Here, the phrase "the surface of the stud nut 30 adjacent to the protruded end is located at a higher position than the surface adjacent to the base" means that the surface adjacent to the protruded end (opening end surface 40) is farther away from, the center axis L1 of the stud nut 30 than the surface adjacent to the base (bottom surface 39). As illustrated in FIG. 5 and FIG. 6, one end of the board 12 fits in the recesses 34 of the three stud nuts 30 that are arranged side by side along one side of the rear surface 19 of the chassis 18. Thus, the board 12 is positionally fixed in the thickness direction (the Z-axis direction) and the Y-axis direction of the liquid crystal display device 10.

Figure 8:
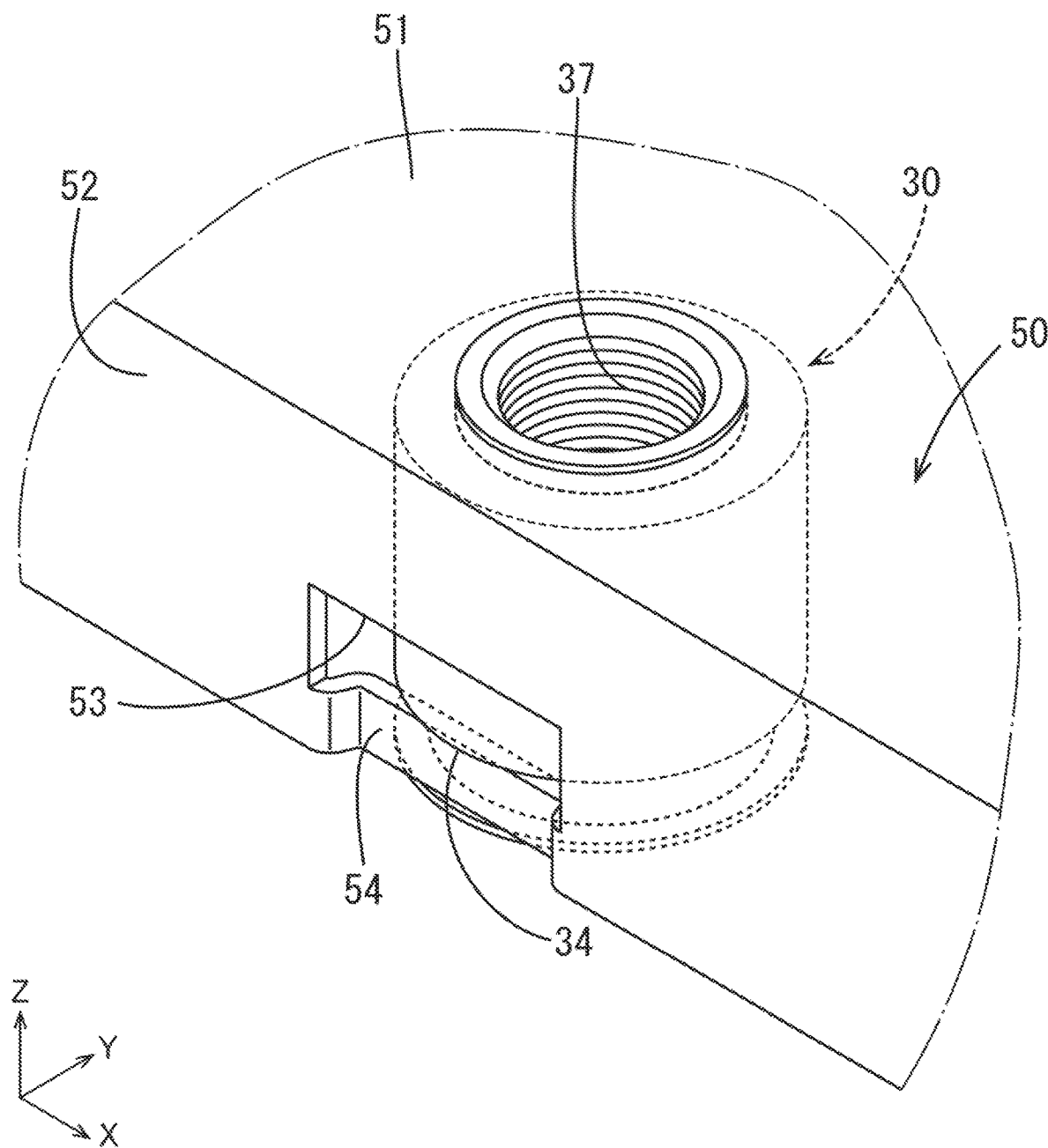
FIG. 8 is a perspective view illustrating an opening in a side wall of the cover and its surroundings.
Figure 9:
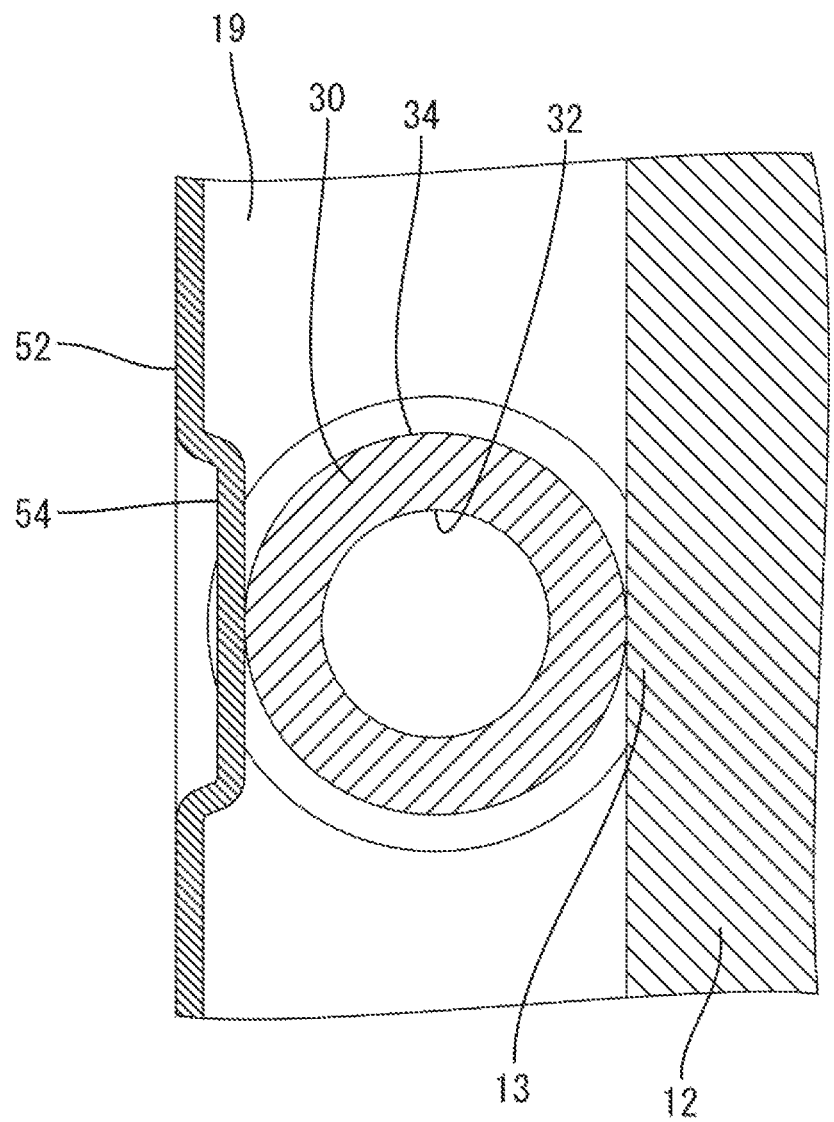
FIG. 9 is a cross-sectional view illustrating the stud nut (taken along line IX-IX in FIG. 2).

As illustrated in FIG. 2, the cover 50 (functional component) is disposed be the board 12 and the opposing component 20 and covers the board 12 from the opposing component 20 (upper side in FIG. 2) side. The cover 50 includes a main wall 51 opposed to the board 12 and a side wall 52 extending from the edge of the main wall 51 toward the backlight device 14. As illustrated in FIG. 6 and FIG. 8, the side wall 52 has rectangular openings 53 at positions corresponding to the stud nuts 30 and opening adjacent portions 54 located next to the openings 53 and bent toward the stud nuts 30. The opening adjacent portion 54 (an end port on of the functional component, a portion of the side wall) fits into the recess 34 of the stud nut 30. This allows the cover 50 to be caught by the stud nut 30. As illustrated in FIG. 9, in this embodiment, the end portion 13 of the board 12 and the opening adjacent portion 54 of the cover 50 fit the into the same recess 34.

Figure 7:
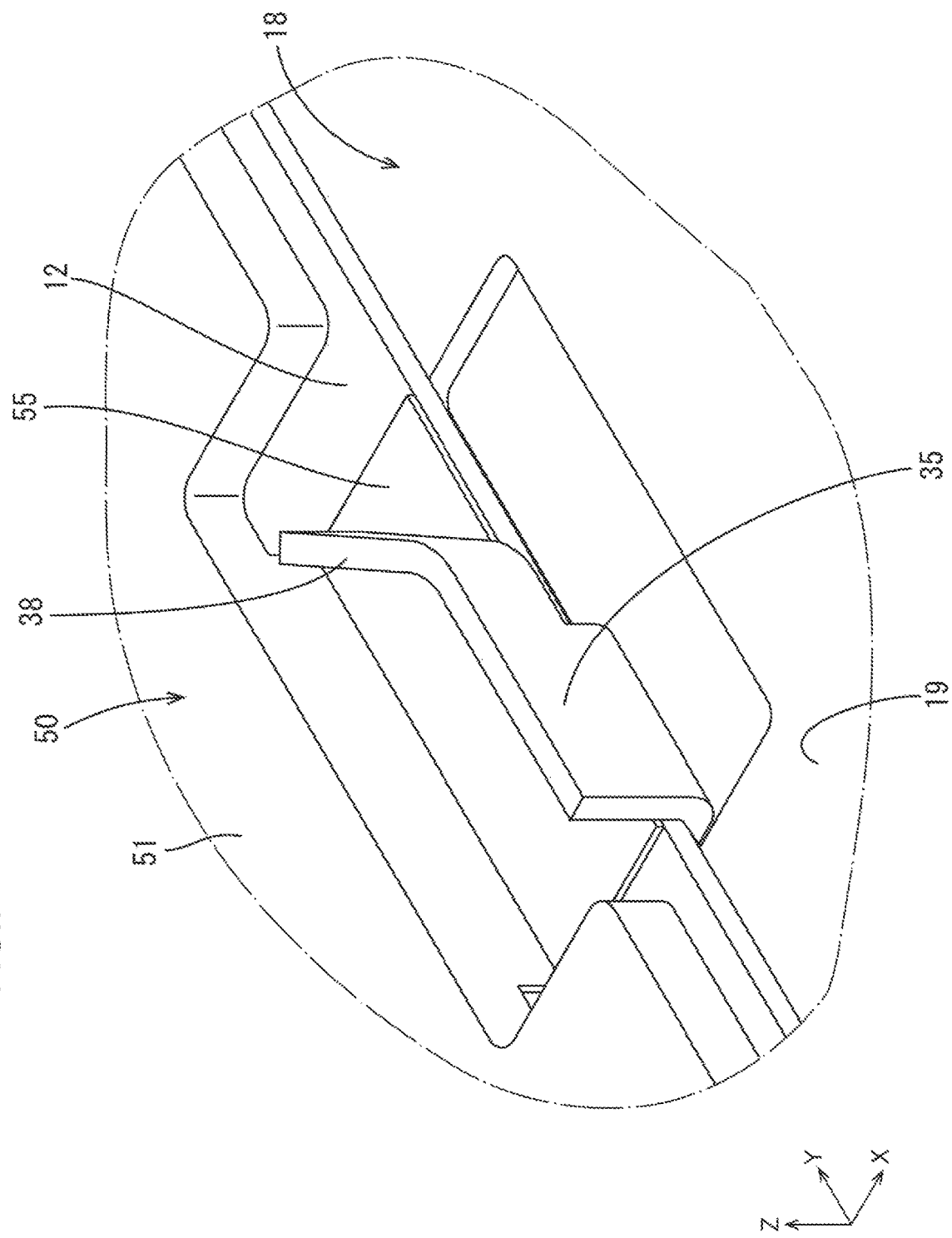
FIG. 7 is a perspective view illustrating a holding piece of the backlight device.

As illustrated in FIG. 7, the main wall 51 of the cover 50 has indented portions 55, at the end portions, each indented toward the backlight device 14. The indented portions 55 are stepped portions. The chassis 18 has cantilevered holding pieces 35 on the rear surface 19 at positions corresponding to the indented portions 55. The holding pieces 35 are portions of the plate member of the chassis 18 that are bent rearward. The holding piece 35 has a front-end portion 38 bent to be positioned over the end portion of the board 12 and the indented portion 55. With this configuration, the end portions of the board 12 at the ends in the X-axis direction and the indented portions 55 are held by the holding pieces 5. As illustrated in FIG. 6, the rear surface 19 has the holding pieces 35 at the two ends in the X-axis direction. The front portion 38 of the holding piece 35 is elastically deformable relative to its base.

Next, advantageous effects of the embodiment are described below. In a comparative example in FIG. 10, a stopper 3 is a bent portion of the chassis 18 included in the backlight device 14. The board 12 is held by a protrusion 5 of the stopper 3. In this configuration, the chassis 18 has a through hole 7 through which light leaks. In the embodiment illustrated in FIG. 2, the board 12 is held in the recess 34 of the stud nut 30, and thus the embodiment does not have the through hole 7. Comparing with the configuration having the stopper in the chassis 18, the embodiment allows less light to leak. Furthermore, the stud nut 30 for fixing the opposing component 20 to the backlight device 14 is used to hold the board 12, eliminating the need for an additional component for holding the board 12. The number of components does not increase.

The surface of the stepped portion 36 that is adjacent to the protruded end of the stud nut 30 is located at a higher position than the surface that is adjacent to the base of the stud nut 30. The stepped portion 36 does not allow the board 12 to be displaced toward the opposing component 20. In this configuration, the board 12 is more reliably held between the stepped portion 36 and the backlight device 14.

Figure 10:
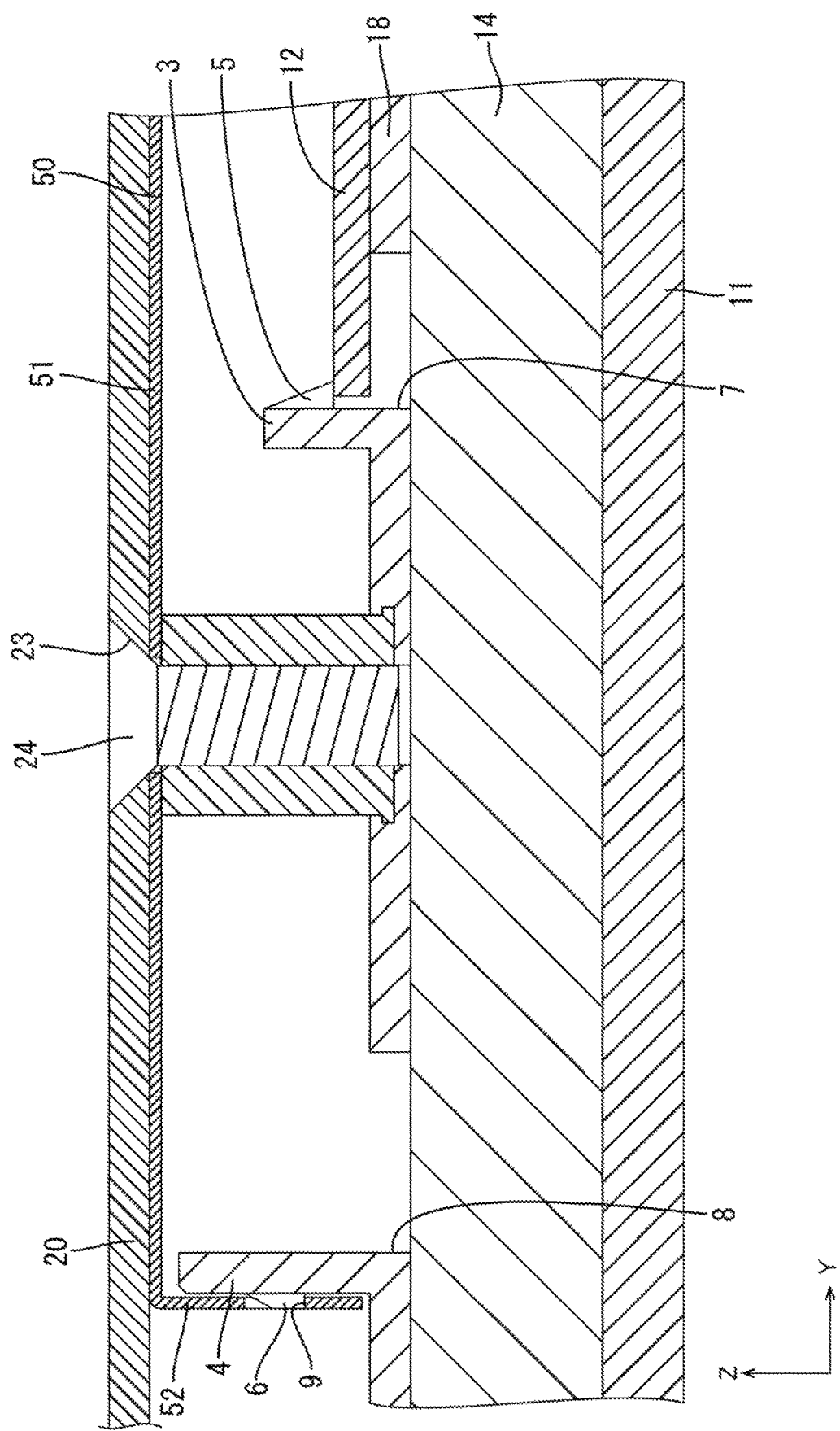
FIG. 10 is a cross-sectional view illustrating a comparative example.

The cover 50 is disposed between the board 12 and the opposing component 20 to cover the board 12 from the opposing component 20 side. The cover 50 includes the main wall 51 opposed to the board 12 and the side wall 52 extending from the edge of the main wall 51 toward the backlight device 14. The end portion 13 of the board 12 and a portion of the side wall 52 fit in the stepped portion 36. As illustrated in FIG. 10, the side wall 52 may be held by a holding structure having a stopper 4. The stopper 4 is a bent portion of the chassis 18 of the backlight device 14, and a protrusion 6 on the stopper 4 fits in a through hole 9 in the side wall 52 of the cover 50. In such a configuration, the chassis 18 has a through hole 8 through which light leaks. The present embodiment, which holds the cover 50 by using the stud nut 30, does not require the stopper 4 (or the through hole 8).

The stud nut 30 is used as the fastener for fixing the opposing component 20 to the backlight device 14. The opposing component. 20 is fixed to the backlight device 14 by the bolt 24 inserted into the stud nut 30. The stud nut 30 is preferably employed, because the stepped portion 36 is more readily formed on the side surface 33, i.e., the outer surface, of the stud nut 30, which has a helical groove on the inner surface, than on the outer surface of the bolt, which has a helical groove on the outer surface.

The stud nut 30 has a cylindrical shape, and the stepped portion 36 extends along the entire circumference of the stud nut 30. This configuration allows the board 12 and the cover 50 to fit in the stepped portion 36 of the stud nut 30.

Second Embodiment

Figure 11:
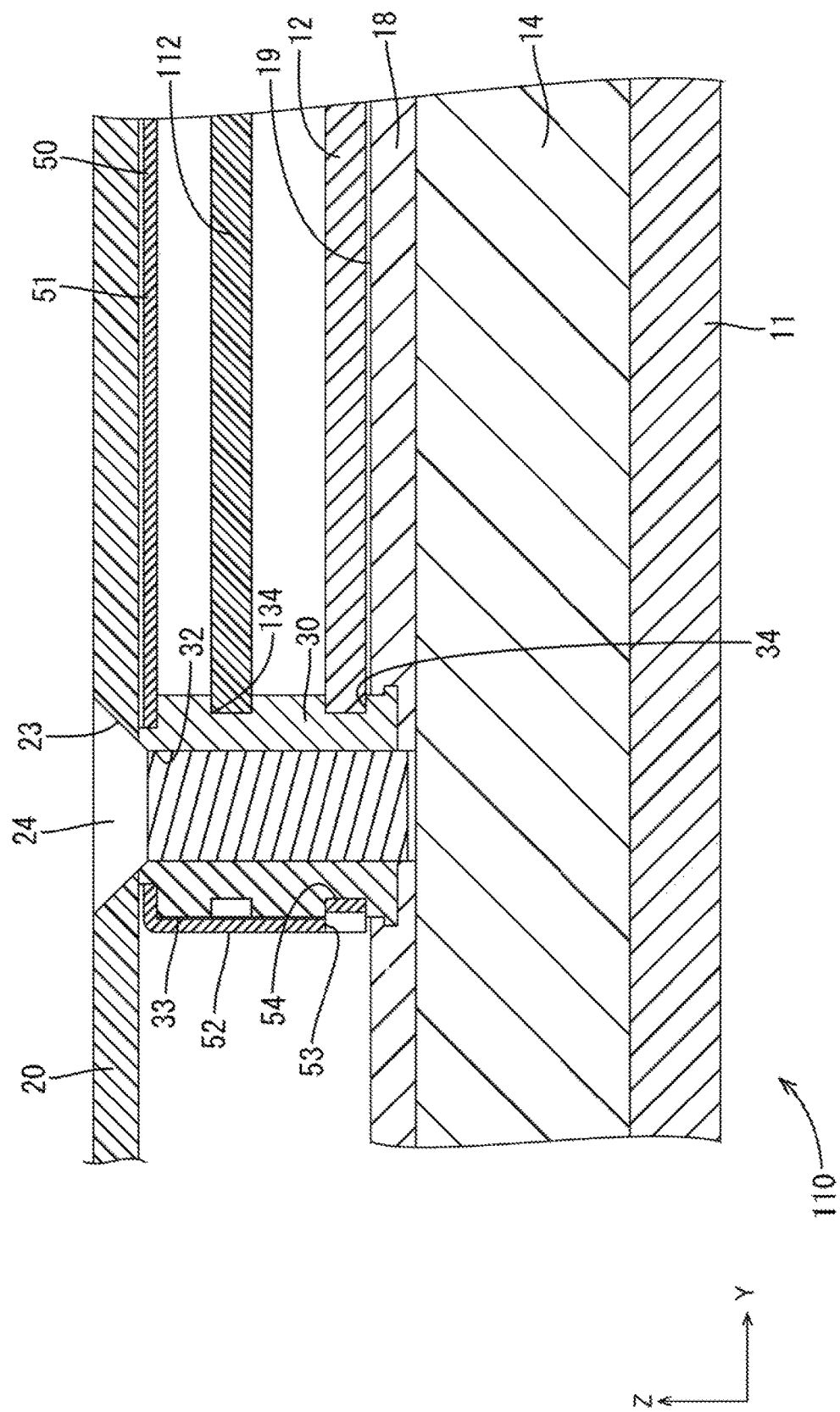
FIG. 11 is a cross-sectional view illustrating a liquid crystal display device and an opposing component according to a second embodiment.

Next, a second embodiment of the technology described herein will be described with reference to FIG. 11. Identical reference numerals are used to denote identical or corresponding components between the first embodiment and the second embodiment and the identical or corresponding components are not described in detail. In a liquid crystal display device 110 of the second embodiment, the side surface 33 of the stud nut 30 has another recess 34 in addition to the recess 34. This configuration allows the board 12 and another board 112 to be held by the stud nut 30. The number of recesses may be three or more. The board 112 may be positioned to have spaces above and below the board 112. Such a configuration enables components to be mounted on the front and rear surfaces of the board 112.

Other Embodiments

The technology described herein is not limited to the embodiments described above and with reference to the drawings. The following embodiments are included in the technical scope.

(1) In the above embodiments, the board 12 and the cover 50 are described as examples of the functional components. The functional component may be any component disposed between the opposing component 20 and the chassis 18.

(2) In the above embodiment, the stud nut is described as an example of the fastener. The fastener may be a bolt. The bolt may have a stepped portion (recess) at a portion adjacent to the base.

(3) The shape of the stud nut 30 is not limited to the cylindrical shape and the stud nut 30 may have any shape. The stud nut 30 may have a polygonal cylindrical shape or may have a shape including flat and curved side surfaces, for example.

(4) The stud nut 30 may be fixed to the chassis 18 by using any technique other than the press-fitting technique. When the chassis 18 is formed of a synthetic resin, insert molding may be employed to form the chassis 18 integrally including the stud nut 30. Alternatively, welding may be employed to fix the stud nut 30 to the chassis 18.

(5) In the above embodiments, the control circuit board for controlling the liquid crystal panel 11 is described as an example of the board. However, the board is not limited to the control circuit board.

(6) In the above embodiments, the recess 34 in the stud nut 30 forms the stepped portion 36, and the position of the board 12 in the thickness direction (Z-axis direction) is determined by the recess 34. However, the position of the board 12 in the thickness direction (Z-axis direction) may be determined by the stepped portion 36 in the stud nut 30 and the chassis 18.

(7) In the above embodiments, the liquid crystal module 15 is described as an example of the display component, but the display component may be any display component not including a backlight device, such as an OLED panel and a plasma display panel.

The invention claimed is:

1. A display device comprising:
a display component configured to display an image and having a display surface and an opposite surface opposite to the display surface;
a fastener included on the opposite surface of the display component and protruding from the opposite surface toward an opposing component that is arranged opposite the opposite surface, the fastener having a stepped portion in a side surface thereof and fixing the opposing component to the display component; and
a functional component disposed between the opposing component and the opposite surface and having an end portion fitted in the stepped portion, wherein the functional component includes a board and a cover covering the board from an opposing component side,
the cover includes a main wall opposed to the board and a side wall extending from an edge of the main wall toward the display component, and
an end portion of the board and a portion of the side wall of the cover fit in the stepped portion.

* * * * *